(12) United States Patent
Messenger

(10) Patent No.: US 8,185,373 B1
(45) Date of Patent: May 22, 2012

(54) METHOD OF ASSESSING LANGUAGE TRANSLATION AND INTERPRETATION

(75) Inventor: Scribner A. Messenger, Columbia, MD (US)

(73) Assignee: The United States of America as represented by the Director, National Security Agency, The, Washington, DC (US)

( * ) Notice: Subject to any disclaimer, the term of this patent is extended or adjusted under 35 U.S.C. 154(b) by 622 days.

(21) Appl. No.: 12/454,039

(22) Filed: May 5, 2009

(51) Int. Cl.
*G06F 17/28* (2006.01)
*G06F 17/27* (2006.01)
(52) U.S. Cl. .............................. 704/2; 704/9
(58) Field of Classification Search ............... 704/2, 9
See application file for complete search history.

(56) References Cited

U.S. PATENT DOCUMENTS

| 5,361,205 | A | * | 11/1994 | Nishino et al. | 704/2 |
|---|---|---|---|---|---|
| 5,408,410 | A | * | 4/1995 | Kaji | 704/2 |
| 5,583,761 | A | * | 12/1996 | Chou | 715/201 |
| 5,867,811 | A | * | 2/1999 | O'Donoghue | 704/1 |
| 6,182,026 | B1 | * | 1/2001 | Tillmann et al. | 704/2 |
| 6,233,545 | B1 | * | 5/2001 | Datig | 704/2 |
| 6,278,969 | B1 | * | 8/2001 | King et al. | 704/7 |
| 6,937,974 | B1 | * | 8/2005 | d'Agostini | 704/2 |
| 7,209,875 | B2 | * | 4/2007 | Quirk et al. | 704/2 |
| 7,249,012 | B2 | * | 7/2007 | Moore | 704/4 |
| 7,249,013 | B2 | * | 7/2007 | Al-Onaizan et al. | 704/9 |
| 7,353,165 | B2 | * | 4/2008 | Zhou et al. | 704/5 |
| 7,366,654 | B2 | * | 4/2008 | Moore | 704/2 |
| 7,536,295 | B2 | * | 5/2009 | Cancedda et al. | 704/4 |
| 7,580,828 | B2 | * | 8/2009 | D'Agostini | 704/2 |
| 7,587,307 | B2 | * | 9/2009 | Cancedda et al. | 704/2 |
| 7,593,843 | B2 | * | 9/2009 | Aue et al. | 704/2 |
| 7,689,416 | B1 | * | 3/2010 | Poirier | 704/235 |
| 7,848,915 | B2 | * | 12/2010 | Gao et al. | 704/2 |
| 7,925,493 | B2 | * | 4/2011 | Watanabe et al. | 704/2 |
| 7,949,523 | B2 | * | 5/2011 | Imoto | 704/228 |
| 8,077,984 | B2 | * | 12/2011 | Cancedda et al. | 382/229 |
| 2002/0111787 | A1 | * | 8/2002 | Knyphausen et al. | 704/2 |
| 2002/0169592 | A1 | * | 11/2002 | Aityan | 704/2 |
| 2004/0002848 | A1 | * | 1/2004 | Zhou et al. | 704/2 |
| 2005/0049851 | A1 | * | 3/2005 | Watanabe et al. | 704/2 |
| 2005/0102130 | A1 | * | 5/2005 | Quirk et al. | 704/4 |
| 2007/0050182 | A1 | * | 3/2007 | Sneddon et al. | 704/2 |
| 2007/0294076 | A1 | * | 12/2007 | Shore et al. | 704/2 |

OTHER PUBLICATIONS

Kingscott, G., "An Approach to Translation Quality Assessment", from the internet: www.language-international.net, Article: Translation Quality Assessment (26-9-07).doc.
Williams, M., "Translation Quality Assessment: An Argumentation-Centered Approach", TTR: traduction, terminologie, redaction, vol. 17, No. 2, 2004, p. 185-190, Ottawa, Canada.
Williams, M., "The Application of Argumentation Theory to Translation Quality Assessment", Meta: Translators' Journal, vol. 46, No. 2, 2001, p. 326-344, Ottawa, Canada.
The Robert Wood Johnson Foundation, "Translation Quality Assessment Tool for Health Education Materials", from the Internet: www.rwjf.org.

* cited by examiner

*Primary Examiner* — Eric Yen
(74) *Attorney, Agent, or Firm* — Robert D. Morelli

(57) ABSTRACT

A method of assessing quality of language translation and interpretation by receiving source material and a translation, identifying the source material's content and format, assigning a first rating to the source material's level of difficulty in translating the source material, determining the translation's type, assigning a second rating to the translation's accuracy, assigning a third rating to the degree to which the translation interprets the source material's intended message, assigning a fourth rating to the formatting of the translation, and evaluating the four ratings to determine an assessment of the translation's language translation and interpretation.

19 Claims, 1 Drawing Sheet

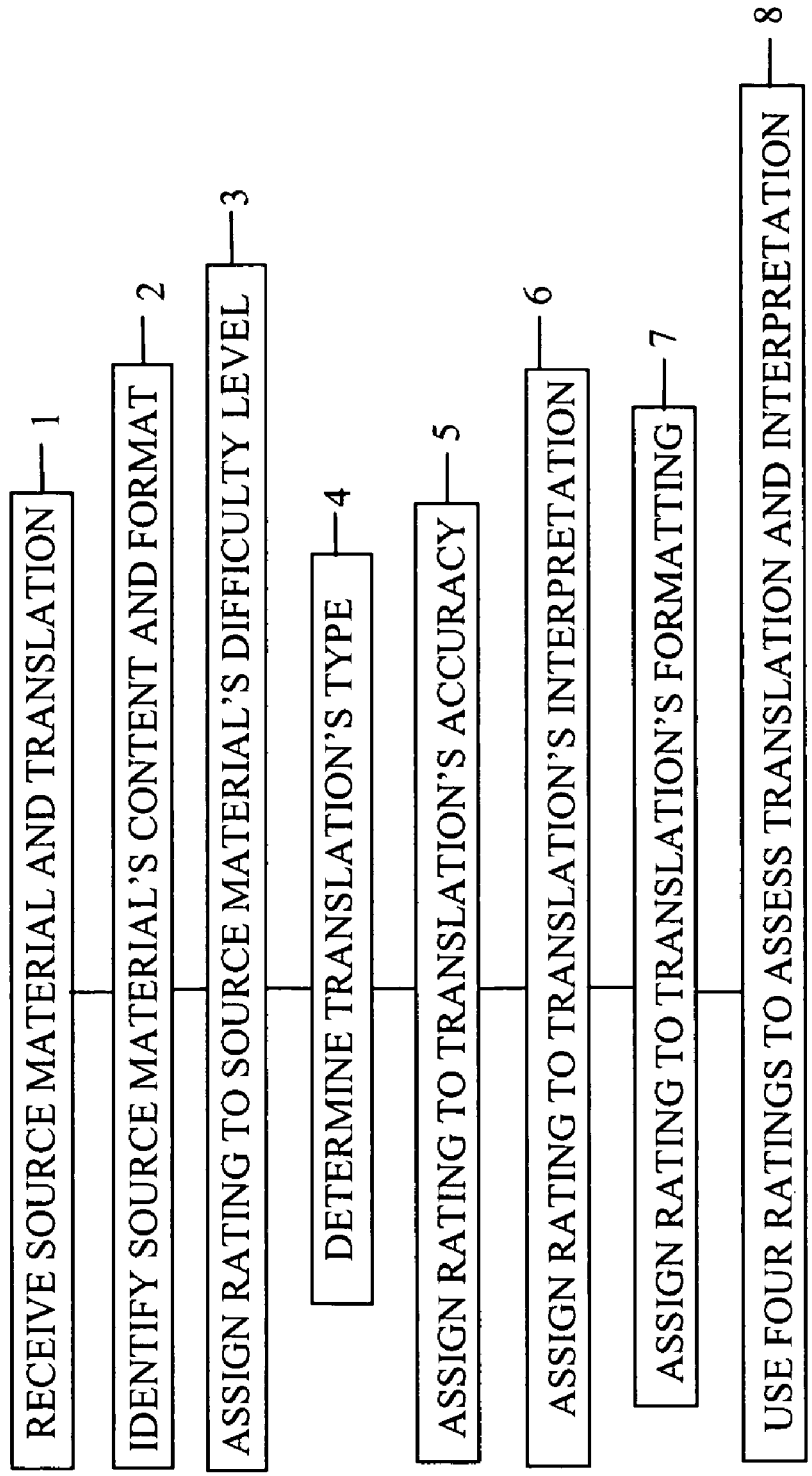

METHOD OF ASSESSING LANGUAGE TRANSLATION AND INTERPRETATION

FIELD OF INVENTION

The present invention relates, in general, to data processing concerning speech signal processing, linguistics, language translation, and audio compression/decompression and, in particular, to language translation and interpretation.

BACKGROUND OF THE INVENTION

People have been translating communications from one language to another for over 2000 years. However, there is still no generally accepted method of assessing the quality of a translation or an interpretation of a communication.

Finding an equivalent word in a target language (i.e., the language into which a communication is translated) for each word in a source language (i.e., the language of the communication translated) is not always adequate due to nuances of words in the source communication, cultural variations between the source and target cultures, lack of a word in the target language that conveys the exact meaning of a word in the source language, and so on.

A translation of anything more than a simple communication such as a yes/no answer may only be an approximation of the source communication, because an adequate translation may require knowledge not contained in the source communication (e.g., the meaning of idioms, the norms of the source culture, etc.).

Prior art translation quality assessment methods focus on microtextual issues (e.g., word choice) rather than macrotextual issues (e.g., conveying the exact sentiment expressed in the source communication). To date there has not been widespread agreement on the criteria to use to assess translations and interpretation.

Prior art articles on the subject of translation and interpretation assessment include "An Approach to Translation Quality Assessment" by Geoffrey Kingscott et al., "Translation Quality Assessment: An Argumentation-Centered Approach" by Malcolm Williams, and "The Application of Argumentation Theory to Translation Quality Assessment" also by Malcolm Williams.

The Robert Wood Johnson Foundation published a translation quality assessment tool for health education materials in which translations were assessed based on priority focus area, readability, functional and technical accuracy, meaning, and specialized content and terminology.

There is a need for a method of assessing language translation and interpretation so that purchasers of translations may assess the accuracy of the product they receive, employers may determine the skill of their translators for job assignment and training purposes, and so on. The present invention discloses such a method.

SUMMARY OF THE INVENTION

It is an object of the present invention to assess language translation and interpretation.

The first step of the method is receiving a communication, hereinafter referred to as source material, and a translation of the source material.

The second step of the method is identifying the source material's content and format.

The third step of the method is assigning a user-definable rating to the source material's level of difficulty in translating the source material.

The fourth step of the method is determining the translation's type.

The fifth step of the method is assigning a user-definable rating to the translation's accuracy as compared to the source material for its type.

The sixth step of the method is assigning a user-definable rating to the degree to which the translation interprets the source material's intended message.

The seventh step of the method is assigning a user-definable rating to the formatting of the translation.

The eighth step of the method is evaluating the results of the third step, the fifth step, the sixth step, and the seventh step to determine a user-definable assessment of the translation's language translation and interpretation.

BRIEF DESCRIPTION OF THE DRAWINGS

FIG. 1 is a flowchart of the steps of the present invention.

DETAILED DESCRIPTION

The present invention is a method of assessing language translation and interpretation. Translation includes not only the transformation of a communication from one language to another but also the translation of a dialect in one language to another dialect of the same language and even the translation of slang in one language to proper speech in the same or different language.

FIG. 1 is a flow chart of the method of the present invention.

The first step 1 of the method is receiving a communication in a first language, hereinafter referred to as source material, and a translation of the source material in a second language, where the first language and the second language may be different languages, different dialects of the same language, or the same language. The source material may be in the following formats: textual, audio, video, or any combination thereof.

The second step 2 of the method is identifying the source material's content and format. The content of the source material includes the presence of cultural background information, diagrams, charts, technical subject matter, an inference based on overt information, intentional deception, lack of continuity, a meaning beyond the literal, multiple objects, multiple concepts, rhetorical devices (i.e., hyperbole, metaphor, rhetorical question, etc.), knowledge known by communicants and necessary for understanding the source material but not disclosed in the source material, spatial relationship, and lack of order. The format of the source material includes its length and the density of information contained therein.

The third step 3 of the method is assigning a user-definable rating to the source material's level of difficulty in translating the source material based on the result of the second step 2. The level of difficulty in translating source material is affected by the following factors: communicants speaking over each other, corrupted source material, use of a dialect, distortion, use of an elliptical communication style, use of a telegraphic communication style, use of an accent, presence of multiple languages, presence of multiple dialects, presence of multiple alphabets, use of non-standard abbreviations, use of specialized terminology, use of non-standard colloquialisms, use of slang, omissions, presence of only one side of a communication, poor grammar, poor handwriting, poor spelling, rapid speech, sudden change in subject of communication, presence of typographical errors, and time-pressure for translation of the source material. The rating includes extremely difficult, very difficult, average difficulty, below average difficulty, and not difficult.

The fourth step 4 of the method is determining the translation's type. Translation type includes verbatim translation of the source material, gist of the source material, gist of the source material on a user-definable topic, and any combination thereof.

The fifth step 5 of the method is assigning a user-definable rating to the translation's accuracy as compared to the source material for its type as determined in the fourth step 4. The accuracy of a translation is a function of the level of execution of the following activities: translation of words and phrases in the language used in the source material to equivalent words and phrases in the language used in the translation, translation of syntax used in the source material to equivalent syntax used in the translation, translation of communicant's intention, perception, nuance, tone, and so on to equivalent intention, perception, nuance, tone, and so on in the translation, and providing exact language of source material when necessary. The rating includes extremely accurate, very accurate, average accuracy, below average accuracy, and not accurate.

The sixth step 6 of the method is assigning a user-definable rating to the degree to which the translation interprets the source material's intended message. A proper interpretation of source material is a function of the degree to which the following characteristics appear in the translation: correct identification of subject, scenario, and significance of source material; identification of who, what, where, when, why, how, and to what extent in source material; identification of people in source material by name and position, identification of references in source material to known events, explanation of obscure references in source material, inclusion of all relevant information in source material, exclusion of irrelevant information in source material, identification of information of interest for further analysis, and inclusion of analytic comments. The rating includes superior interpretation, good interpretation, average interpretation, below average interpretation, and inadequate interpretation.

The seventh step 7 of the method is assigning a fourth user-definable rating to the format of the translation. Proper formatting of a translation is a function of the degree to which the following characteristics appear in the translation: type of translation is identified, a complete and proper header for the translation, includes a well structured summary, follow a logical organization, differentiates comments from source material, identifies omissions, associates communications with its communicant, and employs conventions concerning spelling, grammar, punctuation, usage, date, and time.

The eighth step 8 of the method is evaluating the results of the third step 3, the fifth step 5, the sixth step 6, and the seventh step 7 to determine a user-definable assessment of the translation's language translation and interpretation. The assessment includes superior, good, average, below average, and inadequate.

Using the method, one may determine the quality of a language translation and interpretation and the translation and interpretation abilities of the translator. With such knowledge, one may insure that one is getting the level of service required and paid for, assign translation duties to those who can perform them, determine the need and type of training required to maintain and improve the translation and interpretation skills of a translator, and compare different translators.

What is claimed is:

1. A method of assessing quality of language translation and interpretation, comprising the steps of:
   a) receiving on a computing device source material in a first language and a translation of the source material, where the language of the translation is selected from the group of languages consisting of a language that is different from the first language, a language that is the same as the first language but in a different dialect, and the same language as the first language, where a translation into the same language includes translation slang in a first language to proper speech in the first language;
   b) identifying on the computing device the source material's content and format;
   c) assigning on the computing device a first rating to the source material's level of difficulty in translating the source material based on the result of step (b);
   d) determining on the computing device the translation's type;
   e) assigning on the computing device a second rating to the translation's accuracy as compared to the source material for its type as determined in step (d);
   f) assigning on the computing device a third rating to the degree to which the translation interprets the source material's intended message;
   g) assigning on the computing device a fourth rating to the format of the translation; and
   h) evaluating on the computing device the results of step (c), step (e), step (f), and step (g) to determine an assessment of the translation's language translation and interpretation.

2. The method of claim 1, wherein said step of receiving on a computing device source material is comprised of the step of receiving on the computing device source material in a format selected from the group of formats consisting of textual, audio, video, and any combination thereof.

3. The method of claim 2, wherein said step of identifying on the computing device the source material's content and format is comprised of identifying on the computing device the source material's content and format selected from the group of content and format consisting of cultural background information, diagrams, charts, technical subject matter, an inference based on overt information, intentional deception, lack of continuity, a meaning beyond the literal, multiple objects, multiple concepts, rhetorical devices, knowledge known by communicants and necessary for understanding the source material but not disclosed in the source material, spatial relationship, lack of order, length of information, and density of information.

4. The method of claim 3, wherein said step of assigning on the computing device a first rating to the source material's level of difficulty in translating the source material based on the result of the second step is comprised of the step of assigning on the computing device a first rating to the source material's level of difficulty as a function of the presence within the source material and translation of factors selected from the group of factors consisting of communicants speaking over each other, corrupted source material, use of a dialect, distortion, use of an elliptical communication style, use of a telegraphic communication style, use of an accent, presence of multiple languages, presence of multiple dialects, presence of multiple alphabets, use of non-standard abbreviations, use of specialized terminology, use of non-standard colloquialisms, use of slang, omissions, presence of only one side of a communication, poor grammar, poor handwriting, poor spelling, rapid speech, sudden change in subject of communication, presence of typographical errors, and time-pressure for translation of the source material.

5. The method of claim 4, wherein said step of assigning on the computing device a first rating to the source material's level of difficulty in translating the source material based on the result of the second step is comprised of the step of assigning on the computing device a first rating to the source material's level of difficulty selected from the group of factors consisting of extremely difficult, very difficult, average difficulty, below average difficulty, and not difficult.

6. The method of claim 5, wherein said step of determining on the computing device the translation's type is comprised of the step of determining on the computing device the translation's type selected from the group of translation types consisting of verbatim translation of the source material, gist of the source material, gist of the source material on a user-definable topic, and any combination thereof.

7. The method of claim 6, wherein said step of assigning on the computing device a second rating to the translation's accuracy as compared to the source material for its type as determined in step (d) is comprised of the step of assigning on the computing device a second rating to the translation's accuracy as a function of the execution of activities selected from the group of activities consisting of translation of words and phrases in the language used in the source material to equivalent words and phrases in the language used in the translation, translation of syntax used in the source material to equivalent syntax used in the translation, translation of communicant's intention, perception, nuance, tone, and so on to equivalent intention, perception, nuance, tone, and so on in the translation, and providing exact language of user-definable excerpts of the source material.

8. The method of claim 7, wherein said step of assigning on the computing device a second rating to the translation's accuracy as compared to the source material for its type as determined in step (d) is comprised of the step of assigning on the computing device a second rating to the translation's accuracy selected from the group of translation accuracy ratings consisting of extremely accurate, very accurate, average accuracy, below average accuracy, and not accurate.

9. The method of claim 8, wherein said step of assigning on the computing device a third rating to the degree to which the translation interprets the source material's intended message is comprised of the step of assigning on the computing device a third rating to the degree to which the translation interprets the source material as a function of the inclusion in the translation of characteristics selected from the group of characteristics consisting of correct identification of subject, scenario, and significance of source material; identification of who, what, where, when, why, how, and to what extent in source material; identification of people in source material by name and position, identification of references in source material to known events, explanation of obscure references in source material, inclusion of all relevant information in source material, exclusion of irrelevant information in source material, identification of information of interest for further analysis, and inclusion of analytic comments.

10. The method of claim 9, wherein said step of assigning on the computing device a third rating to the degree to which the translation interprets the source material's intended message is comprised of the step of assigning on the computing device a third rating to the degree to which the translation interprets the source material's intended message selected from the group of interpretation ratings consisting of superior interpretation, good interpretation, average interpretation, below average interpretation, and inadequate interpretation.

11. The method of claim 10, wherein said step of assigning on the computing device a fourth rating to the format of the translation is comprised of the step of assigning on the computing device a fourth rating to the format of the translation as a function of the inclusion in the translation of characteristics selected from the group of characteristics consisting of translation type identification, complete and proper header for the translation, well structured summary, logical organization, differentiation of comments from source material, identification of omissions, association of communication with its communicant, and conventions concerning spelling, grammar, punctuation, usage, date, and time.

12. The method of claim 11, wherein said step of assigning on the computing device a fourth rating to the format of the translation is comprised of the step of assigning on the computing device a fourth rating to the format of the translation selected from the group of format ratings consisting of superior interpretation, good interpretation, average interpretation, below average interpretation, and inadequate interpretation.

13. The method of claim 12, wherein said step of evaluating on the computing device the results of step (c), step (e), step (f), and step (g) to determine a user-definable assessment of the translation's language translation and interpretation is comprised of the step of evaluating on the computing device the results of step (c), step (e), step (f), and step (g) to determine an assessment of the translation's language translation and interpretation selected from the group of assessments consisting of superior, good, average, below average, and inadequate.

14. The method of claim 1, wherein said step of identifying on the computing device the source material's content and format is comprised of identifying on the computing device the source material's content and format selected from the group of content and format consisting of cultural background information, diagrams, charts, technical subject matter, an inference based on overt information, intentional deception, lack of continuity, a meaning beyond the literal, multiple objects, multiple concepts, rhetorical devices, knowledge known by communicants and necessary for understanding the source material but not disclosed in the source material, spatial relationship, lack of order, length of information, and density of information.

15. The method of claim 1, wherein said step of assigning on the computing device a first rating to the source material's level of difficulty in translating the source material based on the result of the second step is comprised of the step of assigning on the computing device a first rating to the source material's level of difficulty as a function of the presence within the source material and translation of factors selected from the group of factors consisting of communicants speaking over each other, corrupted source material, use of a dialect, distortion, use of an elliptical communication style, use of a telegraphic communication style, use of an accent, presence of multiple languages, presence of multiple dialects, presence of multiple alphabets, use of non-standard abbreviations, use of specialized terminology, use of non-standard colloquialisms, use of slang, omissions, presence of only one side of a communication, poor grammar, poor handwriting, poor spelling, rapid speech, sudden change in subject of communication, presence of typographical errors, and time-pressure for translation of the source material.

16. The method of claim 1, wherein said step of determining on the computing device the translation's type is comprised of the step of determining on the computing device the translation's type selected from the group of translation types consisting of verbatim translation of the source material, gist of the source material, gist of the source material on a user-definable topic, and any combination thereof.

17. The method of claim 1, wherein said step of assigning on the computing device a second rating to the translation's accuracy as compared to the source material for its type as determined in step (d) is comprised of the step of assigning on the computing device a second rating to the translation's accuracy as a function of the execution of activities selected from the group of activities consisting of translation of words and phrases in the language used in the source material to equivalent words and phrases in the language used in the translation, translation of syntax used in the source material to equivalent syntax used in the translation, translation of communicant's intention, perception, nuance, tone, and so on to equivalent intention, perception, nuance, tone, and so on in the translation, and providing exact language of source material.

18. The method of claim 1, wherein said step of assigning on the computing device a third rating to the degree to which the translation interprets the source material's intended message is comprised of the step of assigning on the computing device a third rating to the degree to which the translation interprets the source material as a function of the inclusion in the translation of characteristics selected from the group of characteristics consisting of correct identification of subject, scenario, and significance of source material; identification of who, what, where, when, why, how, and to what extent in source material; identification of people in source material by name and position, identification of references in source material to known events, explanation of obscure references in source material, inclusion of all relevant information in source material, exclusion of irrelevant information in source material, identification of information of interest for further analysis, and inclusion of analytic comments.

19. The method of claim 1, wherein said step of assigning on the computing device a fourth rating to the format of the translation is comprised of the step of assigning on the computing device a fourth rating to the format of the translation as a function of the inclusion in the translation of characteristics selected from the group of characteristics consisting of translation type identification, complete and proper header for the translation, well structured summary, logical organization, differentiation of comments from source material, identification of omissions, association of communication with its communicant, and conventions concerning spelling, grammar, punctuation, usage, date, and time.

* * * * *